Patented June 13, 1939

2,162,459

UNITED STATES PATENT OFFICE 2,162,459

SYNTHESIS OF ORGANIC ACIDS HIGHER THAN ACETIC ACID

Donald J. Loder, Wilmington, Del., assignor to E. I. du Pont de Nemours & Company, Wilmington, Del., a corporation of Delaware No Drawing. Original application July 13, 1935, Serial No. 31,209, now Patent No. 2,135,452, dated November 1, 1938. Divided and this application January 27, 1938, Serial No. 187,225

7 Claims. (Cl. 260—532)

This invention relates to a process for the formation of organic compounds and particularly to the preparation of monocarboxylic acids by the interaction of aliphatic alcohols and carbon monoxide in the presence of a catalyst. The application is a division of my copending application S. N. 31,209, filed July 13, 1935, now Patent Number 2,135,452, issued Nov. 1, 1938.

It is known that organic acids and esters can be prepared by the interaction, in the vapor phase, of organic compounds with the oxides of carbon. For example, it has been shown that by the condensation of methyl alcohol with carbon monoxide in the presence of a suitable catalyst, acetic acid and methyl acetate, may be prepared in proportions which are governed by the particular operating conditions.

An object of this invention is to provide improvements in processes for the preparation of higher molecular weight organic compounds thru the introduction of carbon monoxide into the lower molecular weight organic compounds. A further object of the invention is to provide a process for the preparation of monocarboxylic acids by the condensation of an aliphatic alcohol with a carbon oxide in the presence of a catalyst. Another object of the invention is to provide a process for the preparation of acids having the chemical formula:

from alcohols having the chemical formula:

by subjecting the alcohols to the action of the carbon monoxide in the presence of a compound containing boron and a halogen as the catalyst, with or without the presence of an absorbent material such as pumice, silica gel, active carbon, etc. Other objects will hereinafter appear.

The above objects can be realized by reacting a vaporized aliphatic monohydroxy alcohol, carbon monoxide, and a volatile catalyst containing boron and a halogen, under suitable pressure and temperature conditions, over, if desired, an absorbent material such as active carbon or more particularly over activated charcoal. The products resulting from such a reaction will contain generally a mixture of, among other compounds, aliphatic carboxylic acids some of which have a greater, some a lesser, number of carbon atoms than are present in the alcohol treated,—an aliphatic acid containing one more carbon atom than the alcohol, usually, predominating.

The volatile catalyst containing boron and fluorine which are suitable for activating the reaction includes the halides of boron, including boron chloride, boron fluoride, boron iodide, boron bromide, as well as the acids of these halides, such for example, as dihydroxyfluoboric acid, borofluorohydric acid (HBF4), mixtures of HF and boric acid in any degree of dehydration up to $BF_3$ with or without $BF_3$.

Boron fluoride, as well as the other catalysts, may be used alone and because of their excellent activity do not generally require addition agents or promoters to extend their activity. In some instances it may be desirable, as has been indicated, to pass the vapors over an absorbent material such as activated carbon. Other so-called supports may be used such as alumina, activated silica, etc., with or without promoters such as powdered nickel, nickel oxide and the like.

The alcohol-carbon monoxide reaction which can be accelerated by the above described catalysts may be expressed as follows:

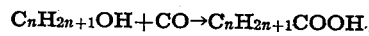

In accordance with the particular operating conditions, it will be found that, in some instances, the acid may not be formed directly in the free state, but may be produced as the ester of the alcohol. The alcohols used may be replaced, if desired, wholly or partly by the corresponding alkyl ethers of the alcohols, such as dimethyl ether, diethyl ether, or the mixed alkyl ethers, the alkyl esters, alkylamines or the alkyl halides. It is generally advantageous, although not essential, to have water vapor present during the alcohol-carbon monoxide to acids reaction.

The synthesis can generally be efficiently carried out under the following operating conditions. The pressure may vary from approximately 25 atmospheres to 900 atmospheres or higher with the preferable operating range in the neighborhood of 350–700 atmospheres. For example, the process can be suitably carried out, with the catalysts of this invention, at temperatures of between 200–400° C., but still higher or lower temperatures may also be used in some cases, the speed of the reaction being increased, as would be expected, by the use of higher temperatures.

The carbon monoxide used may be obtained from various commercial sources, such, for example, as water gas, producer gas, coke oven gas, etc., but to obtain products of the highest degree of purity it is preferable to remove from such commercial gases the objectionable constituents such as sulfur compounds, metal carbonyls, etc.

The presence of inert gases in the alcohol-carbon monoxide mixture is sometimes desirable. Nitrogen, for instance, has little deleterious effect on the reaction or yield and, in fact, may be advantageously used in order to aid in the temperature control and to prevent too great a conversion of the alcohols and carbon monoxide on one pass through the conversion apparatus. Other strictly inert gases usually act similarly. It is, of course, understood that instead of introducing methanol itself into the reaction chamber substances or mixtures of substances which decompose or react to form alcohols or which decompose to form esters or ethers may be employed, but generally I prefer to introduce methanol directly into the gas stream.

Not only can methanol be catalyzed in the presence of carbon monoxide and my catalyst to acetic acid, or methyl actate, but one or more of the higher alcohols, such as ethyl alcohol, propyl alcohol, butyl alcohol, and even the higher molecular weight straight and branched chain alcohols, such, for example, as 2,4 dimethyl pentanol-1, hexyl alcohol or octyl alcohol, may be similarly converted into acids having correspondingly one more carbon atom than the alcohol treated. In fact, my process and catalyst may be employed with any of the monohydric alcohols, providing these alcohols volatilize without decomposition under the conditions existing during the reaction. When converting the higher aliphatic alcohols, some of which are not water soluble, and particularly if water is desired in the reaction, it is preferable, generally, to introduce the alcohol and water into the carbon monoxide as a vapor or spray. Any other suitable procedure may be employed, however, for intimately commingling the vapors of the alcohols and water with the oxide of carbon. When preparing products from the higher molecular weight compounds I may utilize in lieu of the alcohols, the ethers, or esters, thereof, the use of which will result in a good conversion with generally some slight modification in the ratio of acid to other products obtained.

I shall now describe a specific embodiment of my process but it will be understood that the details therein given and the compounds employed, either as reactants or catalysts, in no way restrict the scope of this invention, but merely illustrate a method by which my process may be carried out.

A gaseous mixture, containing 85% carbon monoxide, and 5% each of methanol, water vapor, and hydrogen, is passed together with approximately 2% of boron fluoride into a conversion chamber containing activated charcoal and suitable for the carrying out of gaseous exothermic reactions under elevated pressures. The reaction is conducted at a temperature of approximately 325° C., and a pressure of approximately 700 atmospheres. Upon condensation of the products of the reaction a good yield of acetic acid is obtained together with a small amount of other aliphatic acids.

The process of the above example was repeated with ethanol as the alcohol, the reaction being conducted at a temperature of aproximately 300° C. and a pressure of approximately 600 atmospheres. A good yield of propionic acid and its ethyl ester was obtained.

The apparatus, which may be employed for conducting these reactions, may be of any conventional type and preferably one in which the temperature of the exothermic reaction can be readily controlled at the optimum value. Owing to the corrosive action of acetic acid, the interior of the converter and apparatus leading therefrom should preferably be protected. This may be accomplished by plating the inner surfaces of the apparatus with chromium or silver, or using for the construction of this equipment acid-resisting alloy steels containing, for example, molybdenum, cobalt, tungsten, chromium, manganese or nickel.

From a consideration of the above specification it will be realized that many changes may be made in my process without departing from the invention or sacrificing any of its advantages.

I claim:

1. In a process for the preparation of compounds of the group consisting of aliphatic organic acids, higher than acetic acid, and their esters, the step which comprises reacting carbon monoxide, in the vapor phase and in the presence of a volatile catalyst containing boron and fluoride atoms, with a compound of the group consisting of saturated aliphatic monohydric alcohols, of higher molecular weight than methanol, and compounds which give such alcohols upon hydrolysis.

2. A process of reacting in the vapor phase an aliphatic monohydric alcohol of higher molecular weight than methanol with carbon monoxide in the presence of boron fluoride and thereby producing a compound of the group consisting of aliphatic organic acids, of higher molecular weight than acetic acid, and their esters.

3. A process of reacting in the vapor phase ethanol with carbon monoxide in the presence of boron fluoride and thereby producing a compound of the group consisting of propionic acid and esters of propionic acid.

4. A process of reacting in the vapor phase propanol with carbon monoxide in the presence of boron fluoride and thereby producing butyric acid.

5. A process of reacting in the vapor phase butanol with carbon monoxide in the presence of boron fluoride and thereby producing valeric acid.

6. A vapor phase process for the preparation of propionic acid which comprises reacting ethanol with carbon monoxide in the presence of boron fluoride.

7. A process for the preparation of propionic acid which comprises passing into a reaction zone a gaseous mixture containing approximately 85 parts of carbon monoxide, 5 parts of ethanol and 2 parts of boron fluoride, maintaining the gaseous mixture at a temperature of 350 to 700° C., and at a pressure of from 200 to 400° C., and finally recovering the propionic acid from the reaction product.

DONALD J. LODER.

CERTIFICATE OF CORRECTION.

Patent No. 2,162,459. June 13, 1939.

DONALD J. LODER.

It is hereby certified that error appears in the printed specification of the above numbered patent requiring correction as follows: Page 2, second column, line 29, claim 1, for "fluoride" read fluorine; and that the said Letters Patent should be read with this correction therein that the same may conform to the record of the case in the Patent Office.

Signed and sealed this 1st day of August, A. D. 1939.

(Seal)

Henry Van Arsdale,
Acting Commissioner of Patents.